June 12, 1934.    J. P. CROWLEY ET AL    1,962,765
SURFACING MACHINE
Filed July 20, 1931    7 Sheets-Sheet 1

Inventors
Joseph P. Crowley.
George R. Ford. Jr.
Frank Fraser
Attorney

Inventors
Joseph P. Crowley
George P. Ford Jr.
By Frank Fraser
Attorney

June 12, 1934.  J. P. CROWLEY ET AL  1,962,765
SURFACING MACHINE
Filed July 20, 1931   7 Sheets-Sheet 5

Inventors
Joseph P. Crowley.
George R. Ford Jr.

By Frank Fraser
Attorney

Patented June 12, 1934

1,962,765

UNITED STATES PATENT OFFICE 1,962,765

SURFACING MACHINE

Joseph P. Crowley and George R. Ford, Jr., Toledo, Ohio, assignors to Libbey-Owens-Ford Glass Company, Toledo, Ohio, a corporation of Ohio Application July 20, 1931, Serial No. 551,842

14 Claims. (Cl. 51—119)

The present invention relates to improvements in a machine or apparatus for surfacing (grinding and/or polishing) plate glass or other flat sheets or plates.

Heretofore, in the grinding and polishing of plate glass according to one well known process, it has been customary to secure the sheets or plates of glass to be surfaced upon the tops of a series of cars or tables by embedding them within a layer of plaster of Paris or the like, said tables being then propelled forwardly to carry the glass sheets or plates in a definite substantially horizontal path first beneath and in contact with a series of grinding runners and then beneath and in contact with a series of polishing runners to surface the upper faces thereof, after which the said sheets are turned over upon the tables, again secured thereto, and then passed beneath the same or a second series of grinding and polishing runners to surface the second side.

Although such a system as referred to above has attained considerable commercial success, yet there are nevertheless certain features thereof which, if eliminated, would result in a system even more desirable and advantageous. For instance, in such system, the surfaces of the glass sheets or plates are, of course, treated separately so that considerable time is consumed in the grinding and polishing operations. Also, the securing of the glass sheets upon the tables is a difficult operation requiring highly skilled hand labor, while the turning over and manipulation of the glass sheets sometimes results in the breakage thereof which is attendant with considerable danger to the workman, as well as waste incident to such breakage.

The aim of this invention, therefore, is to obviate those objectionable features noted above and it has for one of its principal objects the provision of a sheet glass surfacing machine which will effect the grinding and/or polishing of opposite surfaces of the sheets or plates of glass simultaneously, thereby resulting in a great saving of time and material, and making it unnecessary to embed the sheets in plaster of Paris or the like.

Another important object of the invention is the provision of a glass surfacing machine by the use of which a considerable cheapening and shortening of the glass surfacing operations may be achieved and also by means of which the amount of handling of the glass may be reduced to a minimum.

Another object of the invention is the provision in a sheet glass surfacing machine, of means for passing the glass sheets to be treated continuously forwardly in a definite predetermined path and for effecting the desired grinding and/or polishing of the said sheets during such travel thereof.

Another object of the invention is the provision of novel means for supplying the desired grinding or polishing medium to the glass sheets and for effecting the proper distribution thereof uniformly over the surfaces of the glass.

A further object of the invention is the provision of such a machine embodying a plurality of grinding and/or polishing units, each including a pair of runner plates between and in contact with which the glass sheets to be treated are passed, means being also provided for effecting a desired movement of the runner plates of each unit transversely of the path of travel of the glass.

A further object of the invention is the provision of means for controlling the distance between the runner plates of each grinding and polishing unit whereby to regulate the pressure thereof upon opposite surfaces of the glass sheets.

Still another object of the invention is the provision of means for effecting a washing and cleaning of the glass sheets between the grinding and polishing operations and also subsequent to polishing, if desired, without stopping the forward movement thereof to the end that when the said sheets leave the machine, they can be forwarded without further treatment directly to the cutting rooms and there cut into commercial sizes.

Other objects and advantages of the invention will become more apparent during the course of the following description when taken in connection with the accompanying drawings.

In the drawings forming a part of this application and wherein like numerals are employed to designate like parts throughout the same.

Briefly stated, in accordance with the present invention, the glass sheets or plates to be treated are adapted to be passed continuously forwardly in a definite substantially horizontal path and, during such travel, the opposite surfaces of the sheets are first simultaneously ground and then polished. After the grinding and prior to polishing, the opposite surfaces of the sheets are subjected to a washing operation so as to remove therefrom any remaining abrasive material and prepare them for polishing. In addition, the sheets are adapted to be subjected to a final washing or cleaning operation subsequent to polishing so that when the said sheets pass from the machine, they are ready to be taken to the cutting rooms where they may be sub-divided into relatively smaller sheets or lights. The washing and cleaning, as well as the grinding and polishing operations, are performed upon the glass sheets during the continuous forward movement thereof.

Referring now more in detail to Figs. 1 to 4 of the drawings, the surfacing machine herein provided comprises a sub-structure or supporting framework 15 including a plurality of spaced longitudinally extending members 16 mounted upon standards or pillars 17 at their opposite ends and also intermediate their ends, if desired. Carried upon the longitudinally extending members 16 are a plurality of spaced transverse I-beams 18, and supported upon these I-beams at each side of the machine are two spaced longitudinally extending channel beams 19 and 20, said beams being disposed on edge and facing one another.

Arranged at the forward or receiving end of the machine are a plurality of horizontally aligned sheet receiving idler rolls 21 mounted upon shaft 22 journaled at their opposite ends in bearing members 23 and 24 which are supported upon plates 25 and 26 carried by the respective pair of channel beams 19 and 20.

Following the idler rolls 21 are a plurality of pairs of horizontally aligned sheet supporting and feeding rolls 27, each pair including a lower roll 28 and an upper roll 29. The plurality of pairs of conveying rolls 27 are all mounted for rotatable movement at their opposite ends within bearing blocks supported upon plates 30 and 31 carried by the corresponding pair of channel beams 19 and 20. Thus, the rolls 28 and 29 of each pair are carried upon shafts 32 and 33 journaled at each end in bearing blocks 34 and 35 respectively. These bearing blocks are provided upon opposite sides thereof with vertically aligned ears 36 and 37 through which pass vertical bolts 38 secured to the respective plate 30 or 31 as at 39. The bearing blocks 34 for the lower roll 28 are secured in fixed position upon the bolts 38 by the nuts 40. Encircling the upper ends of the bolts are compression springs 41, said springs bearing at their lower ends against the ears 37 and at their upper ends against nuts 42 threaded upon said bolts. The springs 41 act to normally urge the rolls 28 and 29 of each pair toward one another and into engagement with the glass sheets passing therebetween. Thus, the rolls are adapted to yieldably grip the glass sheet 43 to be treated therebetween and feed it forwardly while, at the same time, the said rolls are free to move apart from one another. Upon proper adjustment of the nuts 40, the vertical position of the roll 28 may be varied, while the compression of the springs 41 may be controlled by proper adjustment of the nuts 42.

For the purpose of driving the pairs of rolls 27, there is arranged longitudinally of the machine at one side thereof a drive shaft 44 driven from any suitable motor or prime mover (not shown). This shaft extends through a plurality of housings 45, one of which is provided opposite one end of each pair of rolls 27, being carried upon the respective plate 30 outwardly of bearing blocks 34 and 35. Mounted within each housing 45 beneath and above shaft 44 and extending transversely thereof are the relatively short horizontal shafts 46 and 47 to which are keyed worm gears 48 and 49 respectively which mesh with a worm gear 50 on shaft 44. The shafts 46 and 47 are connected to the adjacent ends of shafts 32 and 33 by means of universal connections 51 which are provided so that the upper and lower rolls can be moved relative to one another without affecting the driving thereof.

Arranged between the adjacent pairs of conveying rolls 27 are a plurality of grinding units 52, each unit including horizontally arranged upper and lower runners 53 and 54 respectively spaced from one another so that the glass sheets to be treated may pass therebetween. These grinding units 52 are arranged alternately with the pairs of rolls 27, and the runners 53 and 54 of each unit are superimposed one above and one below the normal path of travel of the sheet so as to act upon opposite surfaces thereof simultaneously as it is passed therebetween. Each grinding runner comprises a substantially flat horizontal plate which may be of the particular form illustrated in Fig. 4, this plate including a substantially rectangular body portion 55 provided along one longitudinal edge thereof with a rectangular extension 56 and at its opposite longitudinal edge with a similar extension 57, with the extension 56 being relatively wider than extension 57.

The grinding action is ordinarily achieved by a relative movement between the grinding runners and the glass in combination with a suitable abrasive material. Therefore, the working face of each runner plate is formed with a longitudinally extending groove or channel 58 disposed intermediate the side edges of the body portion 55, and arranged over the face of the runner and communicating with the supply channel are a plurality of distributing grooves or channels 59. The abrasive material is supplied to the main channel 58 of each runner through a pipe 60 communicating therewith at substantially the center thereof, and the grooves or channels 59 are adapted to distribute the abrasive material uniformly over the entire face of the runner so that it will be caused to exert a uniform grinding action upon the glass. The pipes 60 for feeding the abrasive material to the grinding runners may be associated with and adapted to receive the material from any suitable abrasive grading system and, while the runners of each unit are adapted to receive the same grade of abrasive, yet the runners of each succeeding grinding unit may receive a different grade of abrasive so as to effect the desired treatment of the glass from rough grinding to final smoothing.

The grinding runners 53 and 54 of each unit are carried by resilient strips 61 and 62 respectively, being secured thereto by bolts 63 and held spaced therefrom by the spacing strips 64 which extend transversely of the grinding runners and through which the said securing bolts 63 pass. The upper and lower resilient strips 61 and 62 are secured at their corresponding ends to a block 65 which is positioned therebetween, said strips being secured to the block by suitable fastening elements 66 which pass through slots 67 therein. Each grinding unit 52 is supported at each end upon a vertically disposed pin 68 which is received within a vertical opening in the corresponding block 65. The vertical pin 68 is carried at one end of a horizontal crank arm 70 secured at its opposite end to the upper end of a vertical shaft 71. The shaft 71 is offset with respect to pin 68 and is journaled within a bearing housing 72 carried by the respective channel beam 19.

The several grinding units are adapted to be driven simultaneously from the opposite ends thereof and, to this end, there are arranged at opposite sides of the machine the two longitudinally extending line shafts 73 and 74, said shafts extending through the housings 72 and having keyed thereto spiral gears 75 which mesh with spiral gears 76 carried by the vertical shafts 71. Upon rotation of shafts 73 and 74, the spiral gears 75 will effect rotation of shafts 71 through gears 76, and rotation of shafts 71 will cause the rotation of cranks 70 so as to impart an oscillatible movement to the grinding units transversely of the path of travel of the glass sheets. It will, of course, be apparent that since the upper and lower grinding runners of each unit are connected together, they will be oscillated as a unit. All of the grinding units can be caused to move in the same direction simultaneously while, on the other hand, if preferred, alternate units may move in opposite directions. Each grinding unit 52 may be moved bodily vertically due to the provision of the adjusting screw 77 which passes downwardly through a slot 78 in the upper resilient strip 61 and engages the top of pin 68. Thus, upon proper adjustment of the screws 77, the grinding units may be moved vertically independently of one another to bring them into proper position. Likewise, either end of any one unit may be adjusted vertically relative to the opposite end.

In order to regulate the distance between the operative faces of the grinding runners 53 and 54 of each unit whereby to control the pressure thereof upon opposite surfaces of the glass, there is provided adjacent each end of each unit a member 79 passing downwardly through the two resilient strips 61 and 62 and, in effect, connecting them together. The lower end of the member 79 passes through a slot 80 in the lower resilient strip 62 and is provided with a laterally turned portion or foot 81, while threaded upon the upper end of the said member is a nut 82. When the foot 81 is disposed at right angles to the length of slot 80, the nut 82 can be screwed down upon member 79 so as to effect the desired flexing of the resilient plates 61 and 62 whereby to move the grinding runners closer together and, upon rotation of the nut in the opposite direction, the said runners can be moved apart. By turning the member 79 so that the foot 81 extends longitudinally of slot 80, it can be drawn upwardly therethrough.

Figure 1:
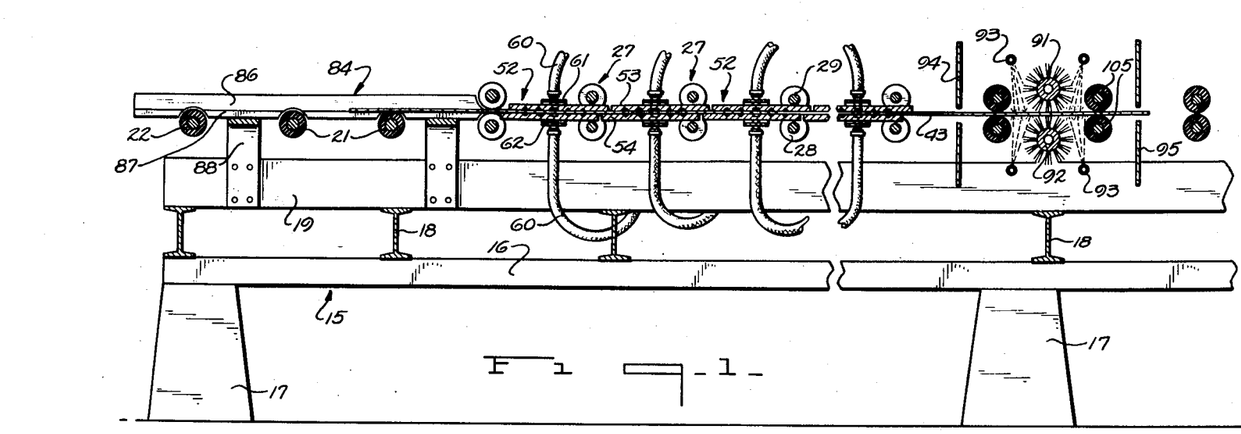
Fig. 1 is a vertical longitudinal section through the forward end portion of a surfacing machine constructed in accordance with the present invention.
Figure 1A:
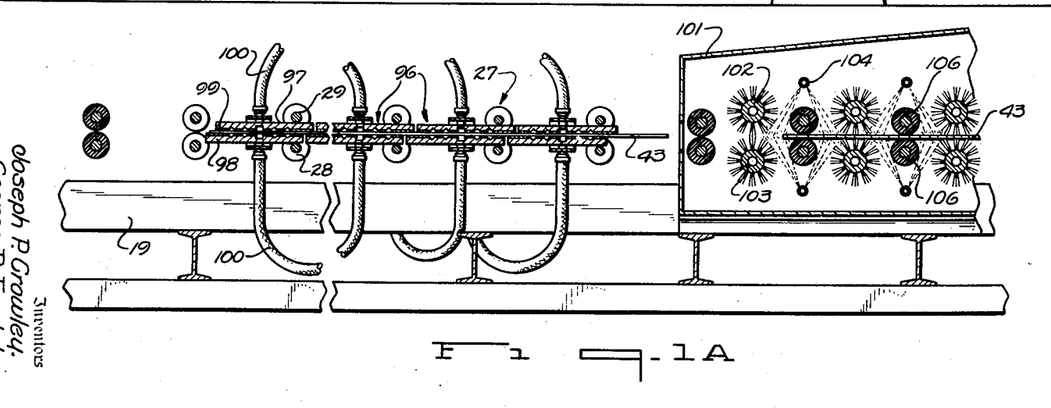
Fig. 1A is a similar view of the rear end portion thereof.
Figure 2:
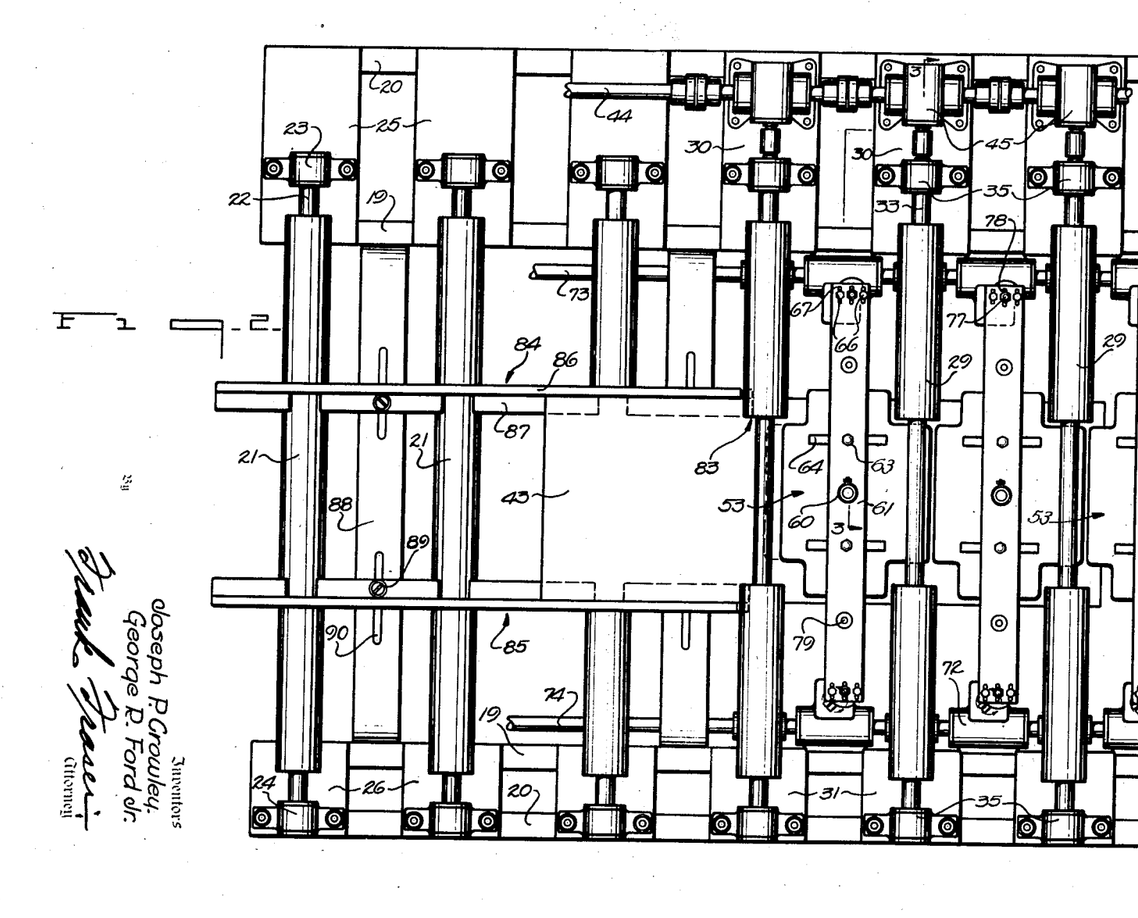
Fig. 2 is a plan view of the forward end portion of the machine.
Figure 3:
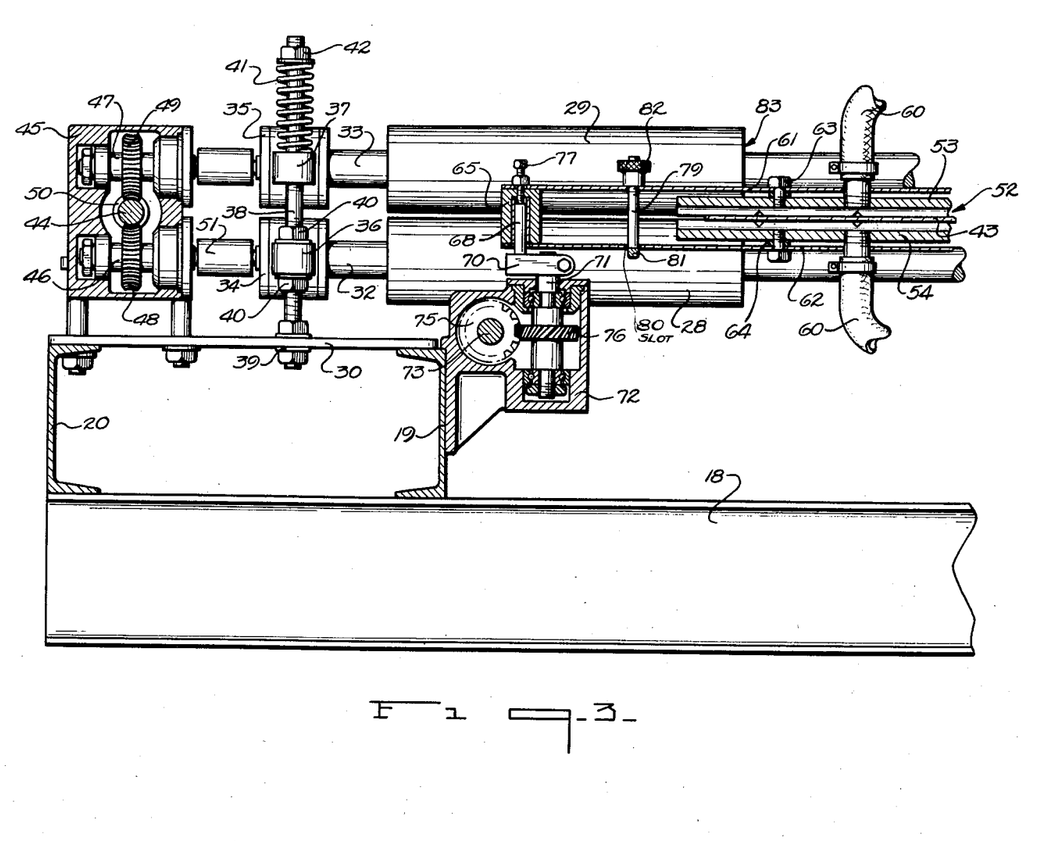
Fig. 3 is a transverse section taken substantially on line 3—3 of Fig. 2.
Figure 4:
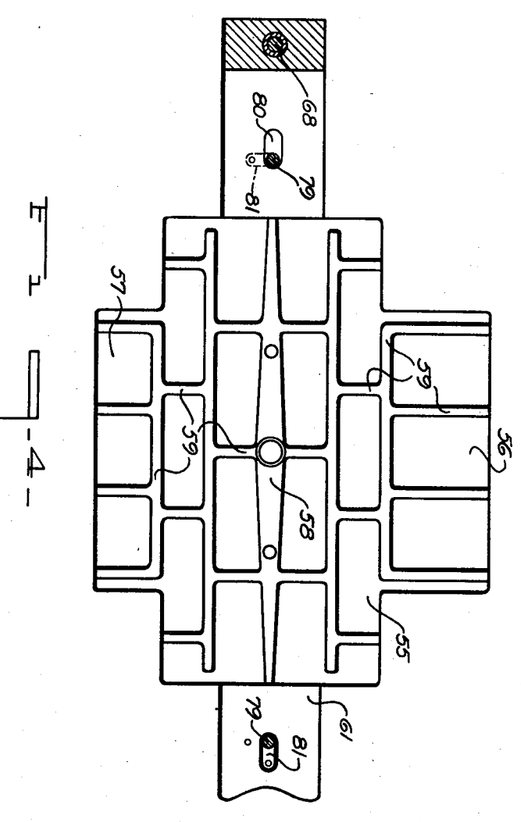
Fig. 4 is a bottom view of one of the grinding runners.

The upper and lower grinding runners 53 and 54 of adjacent units are adapted to be positioned in an overlapping relation with respect to one another so that the glass sheets being treated will remain in contact with and, in effect, be supported by at least one of the runners at all times so as to more efficiently guide the sheets between the successive pairs of runners. This arrangement is best shown in Figs. 1 and 2 and, upon reference thereto, it will be seen that the lower runners 54 are so arranged that the relatively narrow extension 57 of each runner is positioned opposite the wider extension 56 of the next succeeding runner, with the said wider extensions facing forwardly or toward the front of the machine. The upper runners 53 are arranged in the same manner except that they are reversed so that the relatively wider extensions 56 thereof extend to the rear of the machine. Thus, the relatively wide extensions 56 of the upper and lower runners of adjacent units overlap one another. When using grinding runners of this type, it is necessary that the central portions of the conveying rolls 28 and 29 be cut away at their centers as at 83 to permit the proper overlapping of the said runners. However, the body portions 55 of the runners extend outwardly beyond the cut away portions 83 so that the rolls 28 and 29 are adapted to grip the glass sheets 43 at the edges thereof to feed them through the machine. The rolls 28 and 29 are preferably formed of relatively hard rubber and are adapted to grip the sheet in such a manner as to prevent any lateral shifting movement thereof during the transverse oscillating movement of the grinding units.

In order to facilitate the feeding of the glass sheets 43 to the grinding units, there is arranged at the forward end of the machine above idle rolls 21, the spaced longitudinally extending guides 84 and 85, each guide including an upstanding side portion 86 and a horizontal bottom flange 87. These guides are cut away so that the upper portions of the peripheries of the rolls 21 will extend above the flanges 87 so as to support the sheets thereupon. The guide members are carried upon the transverse plates 88, being secured thereto by fastening elements 89 which pass through slots 90 therein so that the guide members can be moved toward or away from one another, dependent upon the size of sheets to be passed through the machine.

After the grinding of the glass sheets has been completed, the said sheets are adapted to be subjected to a washing operation to remove any remaining abrasive and particles of glass therefrom, and this may be accomplished by passing the same between one or a plurality of pairs of upper and lower washing brushes 91 and 92 which engage opposite surfaces of the sheets. Suitable cleaning fluid may be supplied to the opposite surfaces of the glass sheets from a plurality of supply pipes 93. The washing brushes are adapted to be supported in suitable bearing blocks carried by the channel members 19 and 20 and may be driven in any preferred manner. In order to confine the cleaning fluid within a predetermined area, there may be arranged at opposite sides of the washing brushes 91 and 92 vertical baffle plates 94 and 95.

Following the washing means just described are a plurality of polishing units 96 and, while not essential, these units are preferably of substantially the same construction and operated in the same manner as the grinding units 52. However, the operative working faces of the upper and lower polishing runners 97 and 98 of each unit are each covered with a polishing pad 99 of felt or the like which will have the desired polishing action upon the glass. The rouge or other polishing medium to be used may be supplied to the polishing runners and thence to the glass through pipes 100 which are associated with the grinding runners. After the glass sheets have been ground and then washed in the manner above described, the said sheets are passed between the pairs of polishing runners 98 and 99 which function to polish the opposite surfaces thereof.

As the glass sheets pass from the polishing units, they are preferably received within a housing 101 wherein they are subjected to a final washing operation or acid treatment so that when the sheets leave the housing they may be delivered directly to the cutting room and there cut into commercial sizes. The washing of the sheets within housing 101 may be effected by the provision of one or a plurality of pairs of upper and lower washing brushes 102 and 103, suitable cleaning fluid being supplied to the glass from pipes 104. The rolls 105, which are provided for passing the sheets between washing brushes 91 and 92, and likewise the rolls 106 within housing 101 may be formed of relatively hard rubber so that they will act as squeegees to remove the surplus cleaning fluid from the glass.

Figure 5:
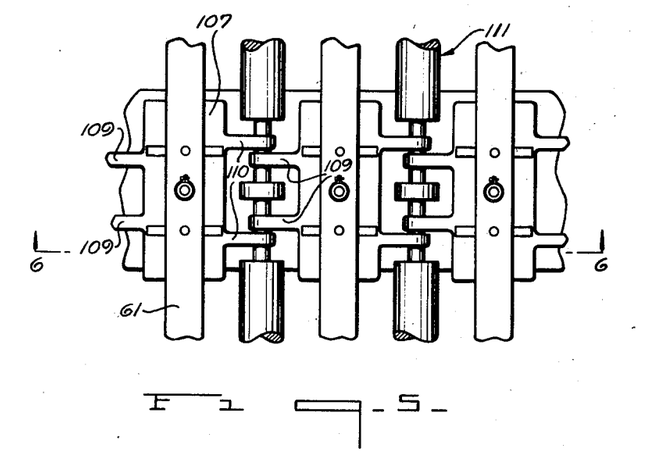
Fig. 5 is a plan view of a slightly different type of grinding runner.
Figure 6:
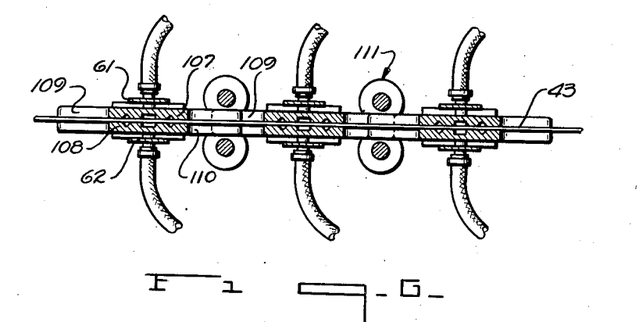
Fig. 6 is a section taken substantially on line 6—6 of Fig. 5.

In Figs. 5 and 6 is illustrated a somewhat different type of grinding unit. In this instance, the upper and lower grinding runners 107 and 108 respectively comprise a substantially rectangular body portion from one side of which extend a pair of spaced fingers 109 and from the opposite side a pair of fingers 110, with the fingers 110 being spaced relatively further apart than fingers 109 so that they are received outwardly of and adapted to overlap the fingers 109 of the next succeeding grinding runner. The purpose of the fingers 109 and 110 is the same as that of the extensions 56 and 57 above described. Thus, during the passage of the sheets from one unit to the next, they will be supported by the overlapping fingers 109 and 110. With this arrangement, the feed rolls 111 are also cut away as shown to make room for the overlapping fingers but otherwise the construction and operation of the grinding units may be the same as the units 52.

Figure 7:
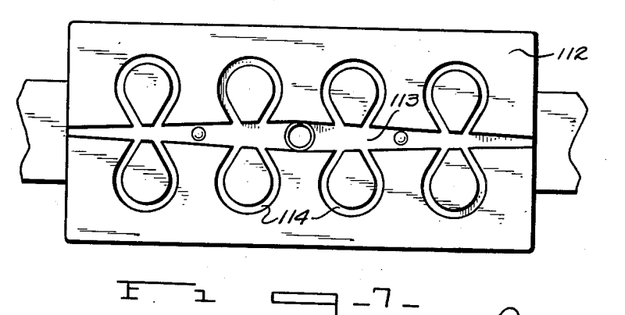
Fig. 7 is a bottom view of still another type of grinding runner.

In Fig. 7 is illustrated the bottom face of another form of grinding runner which may be used. This runner comprises a substantially rectangular metallic plate 112 having formed upon its working face the longitudinally extending supply channel or groove 113 for the grinding medium and from which extend the distributing grooves 114. This runner is substantially the same as the runners 53 and 54 described above, with the exception that the side extensions 56 and 57 are eliminated and the distributing grooves 114 are arranged in a somewhat different manner, preferably in the form of figure eights. When this type of grinding runner is used, the runners of adjacent units do not overlap one another so that it is not necessary that the central portions of the feed rolls 28 and 29 be cut away.

Figure 8:
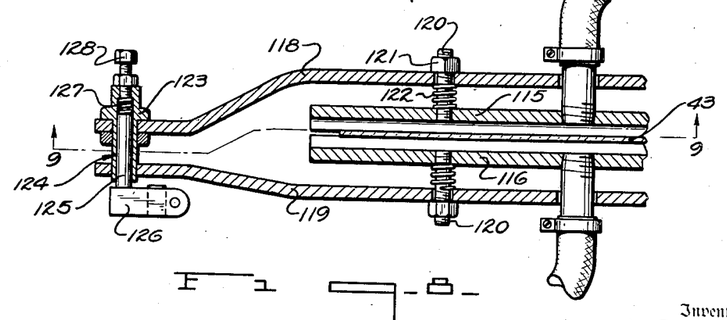
Fig. 8 is a sectional view illustrating a different type of mounting for the grinding runners.
Figure 9:
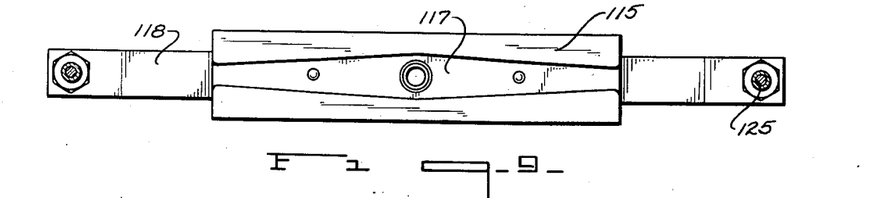
Fig. 9 is a view taken substantially on line 9—9 of Fig. 8.

In Figs. 8 and 9 is disclosed a slightly different type of grinding unit and also a different type of mounting therefor by means of which the runners are yieldably maintained in engagement with the glass while, at the same time, being permitted to float vertically as a unit. Thus, in this case, the upper and lower grinding runners are designated 115 and 116 and, as shown in Fig. 9, consist of a substantially rectangular plate having a relatively large longitudinally extending groove or channel 117 upon the inner face thereof for the reception of the grinding medium. The runners 115 and 116 are carried by plates 118 and 119 respectively, each runner being provided adjacent each end thereof with a bolt 120 threaded therein and passing loosely through an opening in the respective plate 118 or 119. Each bolt 120 has a nut 121 threaded upon the outer end thereof, while encircling each bolt between the respective runner and supporting plate is a compression spring 122, which springs are adapted to normally urge the runners toward one another and thereby yieldably maintain them in engagement with the glass sheets 43 passing therebetween. It will, of course, be readily apparent that, due to the fact that the bolts 120 pass loosely through plates 118 and 119, the grinding runners are free to move toward and away from one another. The supporting plates 118 and 119 are connected together at each end by a member 123 provided with a vertical opening 124 therethrough within which is received the vertical pin 125 corresponding to pin 68 in Fig. 3 and being carried by the crank arm 126. Arranged within opening 124 above pin 125 is a compression spring 127, and threaded within the upper end of said opening is a bolt 128 for regulating the compression of the said spring. From the above, it will be readily seen that the grinding runners are, in effect, supported upon the springs 127 so that they will be permitted a free vertical floating movement.

Figure 10:
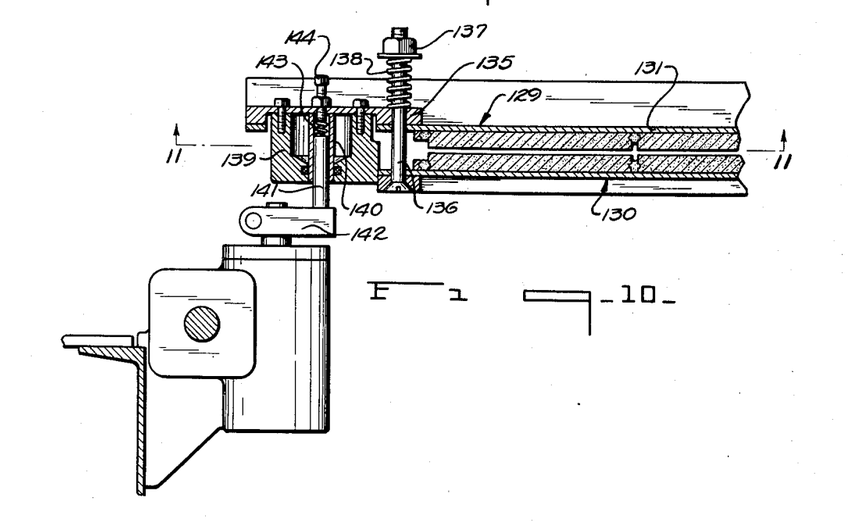
Fig. 10 is a sectional view showing still another form of mounting for the grinding runners.
Figure 11:
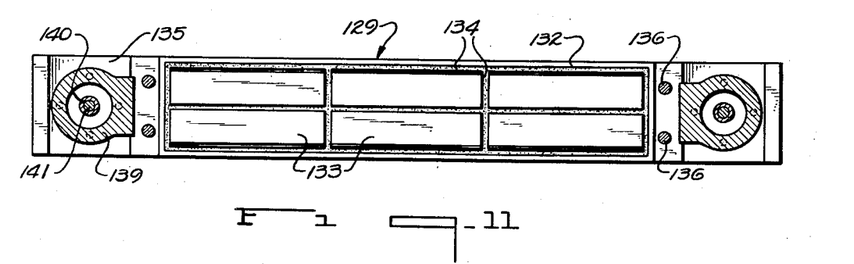
Fig. 11 is a section taken substantially on line 11—11 of Fig. 10.

In Figs. 10 and 11 is illustrated still another form of grinding unit and mounting therefor. In this case, the grinding runners 129 and 130 each comprise a base plate 131 carrying upon its inner surface a rectangular frame 132. Mounted within this frame are a plurality of carborundum plates 133, said plates being spaced inwardly from the frame and also spaced from one another, being secured in position by suitable cement or the like 134. The base plate 131 of the upper runner 129 is carried at each end by a member 135, and passing vertically through this member and also through the plates 131 of the top and bottom runners are the bolts 136. Threaded upon the upper end of each bolt is a nut 137, and encircling the bolt between the nut and member 135 is a compression spring 138, the compression of which is adjustable by the said nut 137. These compression springs function to draw the bolts 136 upwardly and thereby yieldably urge the lower runner 130 toward the upper runner 129 so that the said runners will yieldably engage the glass sheets passing therebetween. Also, by adjusting the nuts 137, the pressure exerted by the upper and lower runners upon the glass sheets may be varied. The grinding runners 129 and 130 are preferably mounted for free vertical floating movement and to this end there is secured to the member 135 at each end thereof a block 139 provided with a bushing 140 within which is received the vertical pin 141 carried by crank arm 142. Arranged within the bushing 140 above pin 141 is a compression spring 143, while passing through member 135 and engaging the compression spring is an adjusting screw 144. Due to the fact that the grinding unit is supported upon the springs 143, they will be permitted to move freely up and down.

Figure 12:
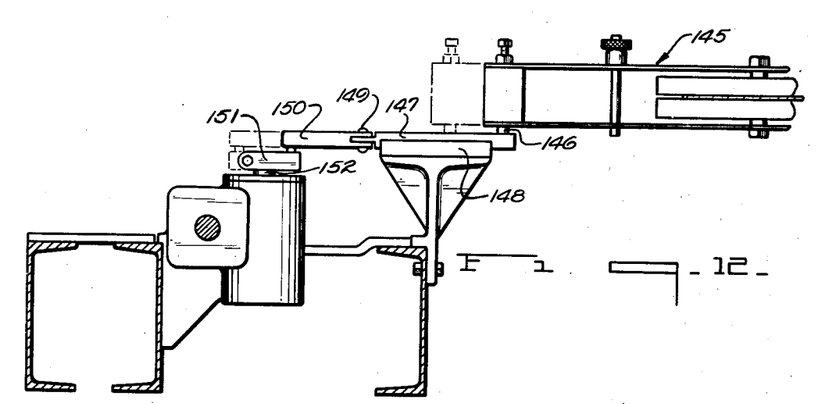
Fig. 12 is a transverse sectional view of a still further form of mounting for the grinding runners.
Figure 13:
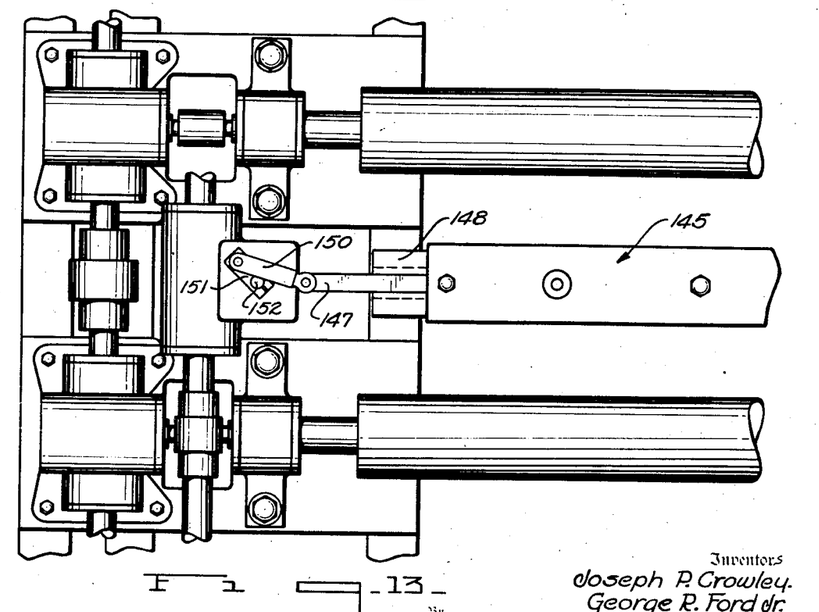
Fig. 13 is a plan view of Fig. 12.

Although, with that form of the invention illustrated in Figs. 1 to 4, the grinding and polishing units are adapted to be oscillated transversely of the path of travel of the glass, yet it will be readily appreciated that a straight reciprocating movement can be used, if desired, instead of an oscillating movement. One type of means which may be utilized for effecting such a reciprocating movement is illustrated, by way of example, in Figs. 12 and 13. As here shown, the grinding unit is designated in its entirety by the numeral 145, and is supported at each end by a vertical pin 146 carried at the outer end of a horizontal slide bar 147 operating within a slideway formed in the upper surface of bracket 148. Pivotally connected to the outer end of the slide bar as at 149 is an arm 150 secured at its opposite end to the crank arm 151 carried by vertical shaft 152. Upon rotation of shaft 152 to drive crank arm 151, the slide bars 147 will be reciprocated back and forth within the slideways in brackets 148, whereby to effect a reciprocating movement of the grinding units transversely of the path of travel of the glass. This type of mounting may also be used to effect a reciprocating movement of the polishing units, if desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, resilient strips carrying the runners, means for connecting the strips together adjacent their opposite ends, and means for moving said resilient strips and runners as a unit transversely of the path of travel of the sheets.

2. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, resilient strips carrying the runners, means for connecting the strips together adjacent their opposite ends, means for moving said resilient strips and runners as a unit transversely of the path of travel of the sheets, and means for moving the resilient strips and runners bodily as a unit relative to the plane of the sheets.

3. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, resilient members carrying the runners, means for connecting the members together, means for moving said resilient members and runners as a unit transversely of the path of travel of the sheets, and means for flexing the resilient members to move the runners toward or away from one another so as to control the pressure thereof upon the said sheets.

4. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, resilient members carrying the runners, means for connecting the members together, means for moving said resilient members and runners as a unit transversely of the path of travel of the sheets, means for moving the resilient members and runners bodily as a unit relative to the plane of the sheets, and means for flexing the resilient members to move the runners toward or away from one another so as to control the pressure thereof upon the said sheets.

5. In apparatus for surfacing sheet glass or other flat sheets or plates, means for passing the sheets to be treated in a definite predetermined path, a plurality of pairs of spaced surfacing runners engaging opposite faces of said sheets to simultaneously surface the same during the travel thereof, and means for moving the runners of each pair as a unit transversely of the path of travel of the sheets, the runners at one side of the sheets overlapping the adjacent runners at the opposite side of said sheets.

6. In apparatus for surfacing sheet glass or other flat sheets or plates, means for passing the sheets to be treated in a definite predetermined path, a surfacing unit engaging opposite faces of said sheets to simultaneously surface the same during the travel thereof, means for mounting said surfacing unit to provide free floating movement thereof relative to the sheets, and means for moving said unit transversely of the path of travel of said sheets.

7. In apparatus for surfacing sheet glass or other flat sheets or plates, means for passing the sheets to be treated in a definite predetermined path, a surfacing unit including spaced runners engaging opposite faces of said sheets to simultaneously surface the same during the travel thereof, means for mounting said runners to effect free floating movement thereof as a unit relative to the sheets, and means for moving the runners as a unit transversely of the path of travel of said sheets.

8. In apparatus for surfacing sheet glass or other flat sheets or plates, means for passing the sheets to be treated in a definite predetermined path, a surfacing unit including a pair of surfacing runners engaging opposite faces of said sheets to simultaneously surface the same during the travel thereof, means for yieldably maintaining said runners in engagement with the sheets, means for mounting the runners to cause free floating movement thereof as a unit relative to the sheets, and means for moving the said runners as a unit transversely of the path of travel of the said sheets.

9. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, a pair of resilient strips carrying the surfacing runners upon the inner adjacent faces thereof, a spacing block positioned between the strips at each end thereof and to which the said strips are secured, each block having an opening therein, a crank pin received within said opening, a rotatable crank carrying said pin, and an adjusting screw passing through each spacing block and engaging the outer end of the respective crank pin for moving the resilient strips and surfacing runners bodily as a unit relative to the plane of the sheets.

10. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, a pair of resilient strips carrying the surfacing runners upon the inner adjacent faces thereof, a spacing block positioned between the strips at each end thereof and to which the said strips are secured, each block having an opening therein, a crank pin received within said opening, a rotatable crank carrying said pin, means for moving the resilient strips and surfacing runners bodily as a unit relative to the plane of the sheets, and means extending between and engaging the resilient strips for flexing the said strips to move the runners toward or away from one another and for maintaining them in such position.

11. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, a pair of plates arranged outwardly of said runners for supporting the same, bolts secured to the said runners and passing loosely through openings in said plates, each bolt having a nut threaded upon the outer end thereof, a compression spring encircling each bolt between the respective surfacing runner and supporting plate and adapted to normally urge the said runners toward one another and thereby yieldably maintain them in engagement with the sheets passing therebetween, means for connecting the supporting plates together at each end, and means for mounting said plates to provide for free floating movement thereof relative to the sheets.

12. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, a pair of plates arranged outwardly of said runners for supporting the same, bolts secured to the said runners and passing loosely through openings in said plates, each bolt having a nut threaded upon the outer end thereof, a compression spring encircling each bolt between the respective surfacing runner and supporting plate and adapted to normally urge the said runners toward one another and thereby yieldably maintain them in engagement with the sheets passing therebetween, a member for connecting the supporting plates together at each end thereof, said member having a vertical opening therethrough, a vertical crank pin received within said opening, a rotatable crank carrying said pin, an adjusting bolt threaded within the upper end of said opening, and a compression spring received within the opening between the crank pin and adjusting bolt to provide for free floating movement of the supporting plates and surfacing members as a unit relative to the glass sheets.

13. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, each surfacing runner including a base plate and a surfacing element carried upon the inner face thereof, a supporting member at each end of the surfacing runners and to which the base plate for the upper runner is secured, a vertical bolt carried at each end of the base plate for the lower runner and passing upwardly through the base plate for the upper runner and also through the respective supporting member, each bolt having a nut threaded upon its upper end, a compression spring encircling each bolt between the nut and supporting member and acting to draw the bolt upwardly and thereby yieldably urge the lower runner toward the upper runner so that the said runners will yieldably engage the glass sheets passing therebetween, and means for supporting the said supporting members and surfacing runners for free vertical floating movement.

14. In apparatus for surfacing sheet glass or other flat sheets or plates, means for passing the sheets to be treated in a definite predetermined path, a pair of surfacing runners engaging opposite faces of said sheets to simultaneously surface the same during the travel thereof, each surfacing runner including a base plate and a surfacing element carried upon the inner face thereof, a supporting member at each end of the surfacing runners and to which the base plate for the upper runner is secured, a vertical bolt carried at each end of the base plate for the lower runner and passing upwardly through the base plate for the upper runner and also through the respective supporting member, each bolt having a nut threaded upon its upper end, a compression spring encircling each bolt between the nut and supporting member and acting to draw the bolt upwardly and thereby yieldably urge the lower runner toward the upper runner so that the said runners will yieldably engage the glass sheets passing therebetween, a block carried by each supporting member and having a vertical opening therethrough, a vertical crank pin received within said opening, a rotatable crank carrying said pin, an adjusting bolt threaded through each supporting member and received within the upper end of the opening in the respective block, and a compression spring arranged within the opening in each block between the crank pin and adjusting bolt for supporting the supporting members and surfacing runners for free vertical floating movement.

JOSEPH P. CROWLEY.
GEORGE R. FORD, Jr.